July 24, 1934.  J. R. T. CLINGAN ET AL  1,967,608
BRICK MAKING MACHINE
Filed March 27, 1930

Inventors
J. R. T. CLINGAN AND
P. J. SHEEHAN
By Monroe E. Miller
Attorney

Patented July 24, 1934

1,967,608

UNITED STATES PATENT OFFICE 1,967,608

BRICK MAKING MACHINE

John R. T. Clingan and Patrick J. Sheehan, Niles, Ohio

Application March 27, 1930, Serial No. 439,510

2 Claims. (Cl. 25—103)

The present invention relates to the art of fire or refractory brick, and aims to produce a silica brick in which spalling is reduced, the fusing point is raised, which is more uniform in size, and which in use has substantially 50% longer life and a proportionate increase in length of service.

Another object of the invention is to provide a process for the production of silica brick which will produce a dense uniform brick which will withstand high temperature and which will be less liable to crack or spall; which will hold its shape in being handled after it is molded and before it is dried and burned; and which may be readily and economically manufactured.

Heretofore, in silica brick making the material has been prepared only in a very wet mud form which could not possibly be used in a brick machine with any success. The present invention provides a method of preparing this material in a semidry condition and wherein the material may be molded and compressed in a brick machine.

It is also an object of the present invention to provide certain improvements in a brick machine adapting the same for use with the silica pebble material and other ingredients in a semi dry condition and which could not be heretofore used in the ordinary brick machine.

A still further object of the present invention is to provide an improved fire or refractory brick as an article containing certain ingredients in certain proportions so as to provide a more durable and longer lasting brick.

The above, and other objects and advantages of this invention will be brought out in the following detailed description of the present preferred embodiment, reference being had as to the structural features of the brick making machine to the accompanying drawing, wherein.

Figure 1:
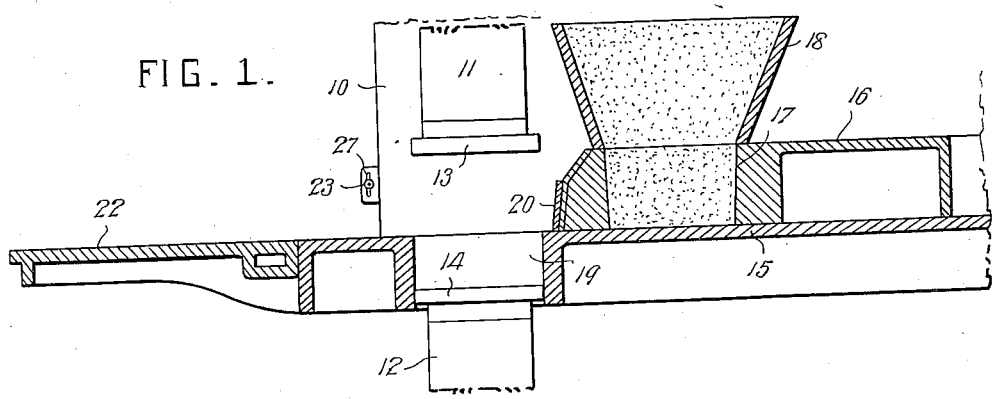
Figure 1 is a fragmentary longitudinal section taken through a portion of a conventional type of brick making machine having the improvements of this invention applied thereto, and showing the charger in position to receive the semidry material.

In carrying out the features of the present invention the initial steps in preparing the material for the brick press is as follows: The basic material which is quarried in solid form comprises silica pebble material containing approximately 60% of sand and approximately 40% pebble of various sizes up to about two inch with an average of one-half inch. This material is some times known as Sharon conglomerate.

This quarried and selected material is passed through a heavy grinder for reducing the material containing coarse particles so that the material will pass through susbtantially a one-eighth inch wire screen so as to provide a basic material which is of a uniform texture.

This ground or screened material is now measured into a wet pan or mixer, and while in the mixer there is added to the material from two to three percent hydrated lime to act as a binder, and additionally, there is added sufficient water to bring the moisture contents of the mixture to between seven and eight percent, or thereabout. It is important to note that the percentage of moisture is relatively low so that the mixture as a whole is in a state which may be termed as a semidry state.

The mixture thus prepared is introduced into a brick machine where it is molded into the desired shape and ejected in the form of brick which may then be placed on a drying car.

These molded bricks are dried in any suitable manner, such as in tunnel driers for approximately forty-eight hours at a heat of about 300° F. The bricks are then removed from the drier and set in kilns where they are gradually brought up to a temperature of approximately 2500° F. though a period of about two weeks time, and then the kiln is closed and allowed to cool. It will be noted that the burning and drying of this brick is practically the same as in other silica brick, but with far better results as to quickness in drying due to the low moisture content, and with a far less tendency to spall or crack, making kiln loss exceptionally low.

An analysis of a brick made in accordance with this process is susbtantially as follows:

| | |
|---|---|
| Silica | 96.15 |
| Alumina | 1.12 |
| Iron oxide | 0.22 |
| Titania | Trace |
| Lime | 2.18 |
| Magnesia | 0.03 |
| Alkalines | 0.29 |
| Approximate total | 99.99 |
| Cold crushing strength | 3,282 (Av. on 4) |
| Spalling loss | 0 |

The result is the production of a brick which is capable of withstanding very high temperatures and which has a life or length of service substantially 50% greater than silica brick heretofore made either with machine or molded by hand. It is thought to be important to provide the working material in a substantially semidry condition, such as approximately seven to eight percent moisture, and to incorporate in the material substantially two to three percent hydrated lime as a binder.

In order that the semidry material may be used in a brick machine, it is found essential to construct a brick machine with certain detailed improvements therein, and such improvements are shown in the accompanying drawing. Referring now to the drawing 10 designates the frame of the machine having substantially vertically spaced side portions between which are mounted the usual upper and lower plungers 11 and 12 provided with their respective die plates 13 and 14.

Arranged horizontally within the frame 10 and intermediate the die plates 13 and 14, is the usual bed plate 15 over the upper surface of which reciprocates back and forth across the path of the die plates 13 and 14, a charger 16. The charger 16 is provided in its forward end with a material receiving opening 17 which extends entirely through the top and bottom surfaces of the charger 16 and which when in retracted position, as shown in Fig. 1, is closed at its bottom and is open at its top to a hopper or chute 18, or a feeder of any suitable construction, adapted to deliver material into the opening 17.

Figure 2:
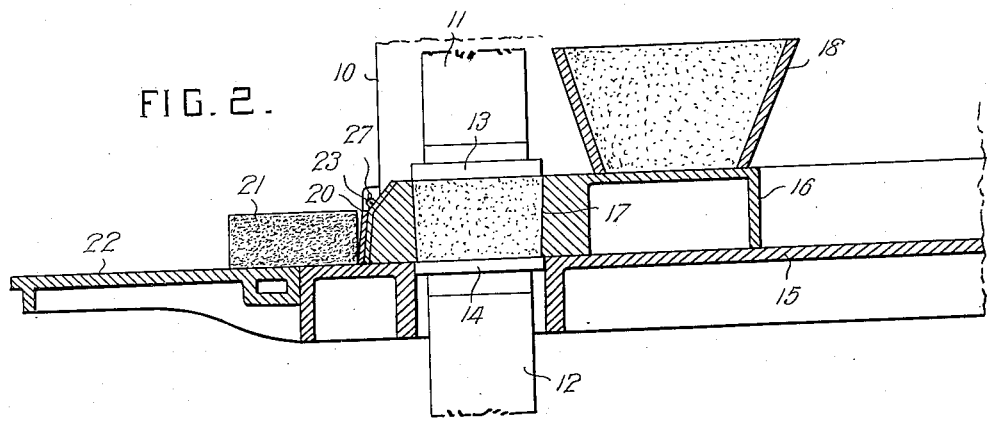
Fig. 2 is a similar view, but showing the charger in advanced position with a molded brick ejected from the machine and showing material in the charger ready to be discharged into the mold cavity.
Figure 3:
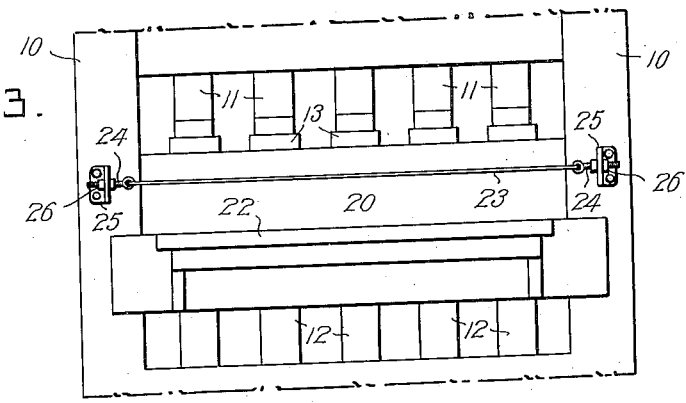
Fig. 3 is a fragmentary front elevation of a brick making machine having the improvements of this invention applied thereto.

The bed plate 15 is provided, in line with the die plates 13 and 14 with a mold cavity 19 with which the opening 17 in the charger 16 is adapted to register when the charger 16 is moved into a forward position as shown in Fig. 2. It will be noted that the opening 17 in the charger is substantially of the same dimensions as the mold cavity, and that the lower end of the opening 17 may be slightly less in cross sectional area than is the size of the mold cavity 19, the illustration being somewhat exaggerated in Fig. 2. This construction and relative sizes of the opening 17 and the mold cavity 19 is for the purpose of insuring the complete discharge of the material from the opening 17 into the mold cavity and so that there will not remain upon the upper surface of the bed plate 15 particles of the brick material to be molded and compressed. This particular construction is for the purpose of offsetting undue wear upon the relatively movable parts of the brick making machine as the character of materials used in making silica refractory brick is such as to cause the rapid grinding or wear of the parts, and thus the rapid destruction of the machine.

Another important feature in the construction of the brick making machine for use with this particular material is in the provision of a charger strip 20 composed of a metal strip which is secured across the forward edge of the charger 16 so as to engage the rear edge portion of the brick 21 to slide the same forwardly out of the machine as shown in Fig. 2. This metallic strip 20 is adapted to fit closely to the upper surface of the bed plate 15 and to prevent the passage of the small particles of the material beneath the charger 16. It will also be noted that the strip 20 is inclined forwardly and downwardly at the front edge of the charger so as to engage the lower edge portion at the rear surface of the brick 21, and to thus prevent injury to the brick during the shifting of the same onto the pallet 22 or other suitable support which may be provided for the brick.

While of course any desired number of mold cavities 19 and corresponding openings 17 in the charger 16 may be provided, in the present instance the machine is shown wherein five of such mold openings and cavities are used. This is for the purpose of increasing the output of the machine.

In order to properly trim the upper surface and edge portions of the brick 21 as the latter is ejected forwardly out of the machine, the present invention provides a trimming wire 23 which is secured at opposite ends in I-bolts 24 adjustably secured in brackets 25 by nuts 26 or the like. Any suitable supporting means may be provided for the wire 23 but in the present instance the brackets 25 are in the shape of angle irons which have base portions secured against the front of the frame 10 at opposite sides of the frame and which may have vertical slots, as shown in Fig. 1 at 27 within which the I-bolts 24 may be adjusted to raise and lower the trimming wire 23.

Having thus described the invention, what is claimed as new is:

1. In a refractory brick making machine, a bed plate having a mold cavity therein, a plunger in the cavity for ejecting a molded brick, a charger slidably mounted on the bed plate and having a material receiving opening therein adapted to register with the mold cavity, a charger strip of metal secured across the forward edge portion of the charger and inclining upwardly and rearwardly thereon, and a trimming wire secured across the forward portion of the machine in line with the upper surface of the formed brick and adapted to engage thereover upon the ejection of the brick by the charger.

2. In a machine for making refractory brick, a frame, brick forming means carried in the frame, ejecting means to eject the formed brick, a pair of brackets mounted upon the opposite sides of the frame at the front thereof, and a trimming wire adjustably mounted on the bracket for adjustment vertically to maintain the wire in line with the upper edge portion of a formed brick and adapted to engage the same when said brick is ejected.

JOHN R. T. CLINGAN.
PATRICK J. SHEEHAN.